United States Patent
Tamura et al.

(10) Patent No.: US 10,434,412 B2
(45) Date of Patent: Oct. 8, 2019

(54) CONTROL APPARATUS, CONTROL METHOD, PROGRAM, AND INFORMATION STORAGE MEDIUM

(71) Applicant: Sony Interactive Entertainment Inc., Tokyo (JP)

(72) Inventors: Keigo Tamura, Tokyo (JP); Fumiaki Hisamatsu, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 200 days.

(21) Appl. No.: 15/503,876

(22) PCT Filed: May 26, 2015

(86) PCT No.: PCT/JP2015/065133
§ 371 (c)(1),
(2) Date: Feb. 14, 2017

(87) PCT Pub. No.: WO2016/063564
PCT Pub. Date: Apr. 28, 2016

(65) Prior Publication Data
US 2017/0239567 A1 Aug. 24, 2017

(30) Foreign Application Priority Data
Oct. 24, 2014 (JP) .................................. 2014-217764

(51) Int. Cl.
*A63F 13/424* (2014.01)
*G06F 3/16* (2006.01)
(Continued)

(52) U.S. Cl.
CPC .......... *A63F 13/424* (2014.09); *A63F 13/215* (2014.09); *A63F 13/53* (2014.09);
(Continued)

(58) Field of Classification Search
None
See application file for complete search history.

(56) References Cited

U.S. PATENT DOCUMENTS

| 5,632,002 A | 5/1997 | Hashimoto |
| 7,505,910 B2 | 3/2009 | Kujirai |

(Continued)

FOREIGN PATENT DOCUMENTS

| JP | 02272624 A | 7/1990 |
| JP | 07140998 A | 6/1995 |

(Continued)

OTHER PUBLICATIONS

Supplementary European Search Report for corresponding EP Application No. 15853373.7, 10 pages, dated May 11, 2018.
(Continued)

*Primary Examiner* — Neeraj Sharma
(74) *Attorney, Agent, or Firm* — Matthew B. Dernier, Esq.

(57) ABSTRACT

Provided are a control apparatus, a control method, a program, and an information storage medium that are configured, if an execution of processing based on speech recognition is disabled, to make a user recognize that, if recognition of an accepted speech is successful, the execution of processing based on speech recognition is disabled. A speech acceptance block accepts a speech. An execution block executes processing according to a result of recognition of the speech. An output control block executes control so that information indicative that execution of processing based on speech recognition is disabled is outputted. In accordance with success in the recognition of the speech, one of the execution of the processing according to the result of the recognition of the speech and the output control of the
(Continued)

information indicative that the execution of processing based on speech recognition is disabled is executed.

9 Claims, 7 Drawing Sheets

(51) Int. Cl.
| | | |
|---|---|---|
| *G10L 15/00* | (2013.01) | |
| *G10L 15/28* | (2013.01) | |
| *A63F 13/53* | (2014.01) | |
| *A63F 13/215* | (2014.01) | |
| *A63F 13/87* | (2014.01) | |
| *G10L 15/22* | (2006.01) | |

(52) U.S. Cl.
CPC .............. *A63F 13/87* (2014.09); *G06F 3/16* (2013.01); *G10L 15/00* (2013.01); *G10L 15/22* (2013.01); *G10L 15/28* (2013.01); *G10L 2015/223* (2013.01)

(56) References Cited

U.S. PATENT DOCUMENTS

| 8,023,666 | B2 | 9/2011 | Nakajima |
| 8,165,886 | B1 | 4/2012 | Gagnon |
| 8,264,422 | B1* | 9/2012 | Persson ................ G06Q 10/087 345/7 |
| 8,412,531 | B2 | 4/2013 | Sullivan |
| 8,781,837 | B2 | 7/2014 | Yamamoto |
| 8,903,728 | B2 | 12/2014 | Maeda |
| 9,256,396 | B2* | 2/2016 | Monson ................ G06F 3/167 |
| 9,460,717 | B2* | 10/2016 | Kim ........................ G10L 15/22 |
| 2002/0198721 | A1* | 12/2002 | Weiser .................... G10L 15/01 704/275 |
| 2003/0028382 | A1* | 2/2003 | Chambers ............... G10L 15/26 704/275 |
| 2004/0073493 | A1 | 4/2004 | Kato |
| 2004/0203520 | A1* | 10/2004 | Schirtzinger ........... G06F 1/162 455/90.3 |
| 2004/0260562 | A1 | 12/2004 | Kujirai |
| 2005/0159833 | A1 | 7/2005 | Giaimo |
| 2007/0021205 | A1 | 1/2007 | Filer |
| 2008/0107286 | A1 | 5/2008 | Nakajima |
| 2009/0209319 | A1* | 8/2009 | Okada ................. G07F 17/3209 463/20 |
| 2010/0053471 | A1* | 3/2010 | Shikata .................... H04N 5/60 348/738 |
| 2010/0318366 | A1 | 12/2010 | Sullivan |
| 2011/0075818 | A1 | 3/2011 | Vance |
| 2011/0223893 | A1 | 9/2011 | Lau |
| 2013/0035942 | A1 | 2/2013 | Kim |
| 2013/0281987 | A1 | 10/2013 | Maeda |
| 2015/0066516 | A1 | 3/2015 | Nishikawa |
| 2015/0134341 | A1* | 5/2015 | Tamura ............... G06F 3/04842 704/275 |
| 2015/0350421 | A1 | 12/2015 | Lau |
| 2015/0364142 | A1* | 12/2015 | Sankaranarayanan ....................... G06F 21/32 704/275 |

FOREIGN PATENT DOCUMENTS

| JP | 10222337 A | 8/1998 |
| JP | 11337362 A | 12/1999 |
| JP | 2001222293 A | 8/2001 |
| JP | 2004234273 A | 8/2004 |
| JP | 2005027885 A | 2/2005 |
| JP | 2008102384 A | 5/2008 |
| JP | 2012185861 A | 9/2012 |
| JP | 2013041580 A | 2/2013 |
| KR | 20130068303 A | 6/2013 |
| WO | 2013061857 A1 | 5/2013 |

OTHER PUBLICATIONS

International Search Report for related PCT Application No. PCT/JP2015/074188, 6 pages, dated Nov. 10, 2015.
International Preliminary Report on Patentability and Written Opinion for related PCT Application No. PCT/JP2015/074188, 16 pages, dated May 4, 2017.
Notification of Reasons for Refusal for related JP Application No. 2016-555123, 9 pages, dated Aug. 8, 2017.
Office Action for related U.S. Appl. No. 15/508,213, 9 pages, dated Oct. 10, 2017.
International Search Report for corresponding PCT Application No. PCT/JP2015/065133, 4 pages, dated Aug. 11, 2015.
International Preliminary Report on Patentability and Written Opinion for corresponding PCT Application No. PCT/JP2015/065133, 14 pages, dated May 4, 2017.
Office Action for corresponding KR Application No. 1020177007237, 9 pages, dated Feb. 27, 2018.
Office Action for related U.S. Appl. No. 15/508,213, 11 pages, dated Apr. 18, 2018.

* cited by examiner

FIG. 7

| VALUE OF STATUS INFORMATION | VALUE OF FOCUS STATUS INFORMATION | VALUE OF ENABLE/DISABLE REQUEST INFORMATION | VALUE OF VOICE COMMAND EXECUTION ENABLE/DISABLE INFORMATION |
|---|---|---|---|
| AT LEAST 1 IS "1" | 1 | 1 | 1 |
| | 1 | 0 | 1 |
| | 0 | 1 | 1 |
| | 0 | 0 | 1 |
| | 1 | 1 | 1 |
| | 1 | 0 | 0 |
| | 0 | 1 | 0 |
| ALL 0 | 0 | 0 | 0 |

CONTROL APPARATUS, CONTROL METHOD, PROGRAM, AND INFORMATION STORAGE MEDIUM

TECHNICAL FIELD

The present invention relates to a control apparatus, a control method, a program, and an information storage medium.

BACKGROUND ART

Technologies are known in which a speech entered by a user is accepted, a command in accordance with the result of recognition of this speech is identified, and the processing in accordance with this command is executed.

SUMMARY

Technical Problems

If a speech-related program such as a voice chat program or a voice message program, for example, is being executed, it is possible that the processing in accordance with the result of recognition of an entered speech will be executed despite user's intentions. In addition, there is fear of command competitions if the execution of the processing in accordance with the result of speech recognition is enabled in the case of a system program such as an operating system or a game program that is executed separately from the system program. Further, depending upon a game program to be executed, it may be desirable that the processing in accordance with the result of speech recognition be not executed so as to keep the world view of the game. For example, in the case mentioned above, it is desirable that the execution of processing based on speech recognition be disabled.

If the execution of processing based on speech recognition is disabled, it would be convenient for a user to be able to recognize that the execution of processing based on speech recognition is disabled when the recognition of an accepted speech is successful. However, any technologies are unknown that allow a user to recognize the disablement of the execution of processing based on speech recognition in the above-mentioned situation.

Therefore, the present invention has been made with respect to the problems addressed above and one object of the present invention is to provide a control apparatus, a control method, a program, and an information storage medium that allow a user to recognize the disablement of the execution of processing based on speech recognition when the recognition of an accepted speech is successful if the execution of processing based on speech recognition is disabled.

Solution to Problems

In order to solve the above-mentioned problems, an control apparatus according to the present invention includes a speech acceptance block configured to accept a speech; an execution block configured to execute processing according to a result of recognition of the speech; and an output control block configured to execute control so that information indicative that execution of processing based on speech recognition is disabled is outputted, wherein, in accordance with success in the recognition of the speech, one of the execution of the processing according to the result of the recognition of the speech and the output control of the information indicative that the execution of processing based on speech recognition is disabled is executed.

Further, a control method according to the present invention includes a step of accepting a speech; a step of executing processing according to a result of recognition of the speech; and a step of executing control so that information indicative that execution of processing based on speech recognition is disabled is outputted, wherein, in accordance with success in the recognition of the speech, one of the execution of the processing according to the result of the recognition of the speech and the output control of the information indicative that the execution of processing based on speech recognition is disabled is executed.

Still further, a program according to the present invention causes a computer to execute a procedure of accepting a speech; a procedure of executing processing according to a result of recognition of the speech; and a procedure of executing control so that information indicative that execution of processing based on speech recognition is disabled is outputted, wherein, in accordance with success in the recognition of the speech, one of the execution of the processing according to the result of the recognition of the speech and the output control of the information indicative that the execution of processing based on speech recognition is disabled is executed.

Yet further, a computer-readable information storage medium according to the present invention stores a program causing a computer to execute a procedure of accepting a speech; a procedure of executing processing according to a result of recognition of the speech; and a procedure of executing control so that information indicative that execution of processing based on speech recognition is disabled is outputted, wherein, in accordance with success in the recognition of the speech, one of the execution of the processing according to the result of the recognition of the speech and the output control of the information indicative that the execution of processing based on speech recognition is disabled is executed.

In an aspect of the present invention, as an execution of processing based on a recognition result of the speech, output control is executed for outputting information for guiding a speech to be entered.

In another aspect of the present invention, an execution enable/disable control block configured to control enablement/disablement of the execution of processing based on speech recognition is further provided, wherein, if the recognition of the speech is successful and control is executed so that the execution of processing based on speech recognition is disabled, then the output control block executes control so that information indicative that the execution of processing based on speech recognition is disabled is outputted in accordance with success in the recognition.

In the above-mentioned aspect, a control information acceptance block configured to accept, from a program being executed, control information for controlling enablement/disablement of processing based on speech recognition is further provided, wherein, on the basis of the control information accepted by the control information acceptance block, the execution enable/disable control block may execute control of enablement/disablement of the execution of the processing according to the result of the recognition of the speech.

Further, the control information acceptance block may accept the control information from a plurality of programs being executed, and at least one of the plurality of programs may be a game program that is executed separately from a system program to be executed in the control apparatus.

Alternatively, information indicative that the execution of processing based on speech recognition is disabled, the information being controlled to be outputted by the output control block, may show a program that outputted the control information.

Still further, in accordance with a manipulation input accepted from a controller, the execution block may execute processing that is controlled not to be executed in accordance with the recognition result of the speech.

Yet further, the execution enable/disable control block may execute control so that, for some of a plurality of commands, the execution of processing based on speech recognition corresponding to the command is disabled; and the output control block may execute control so that information is outputted which indicates that, when a command belonging to the some of the plurality of commands is identified as the recognition result of the speech, processing corresponding to the command is disabled in accordance with the identification of the command.

BRIEF DESCRIPTION OF DRAWINGS

FIG. 7 is a diagram illustrating one example of a relation between control information values and voice command execution enable/disable information values.

DESCRIPTION OF EMBODIMENT

In what follows, one embodiment of the present invention will be described in detail.

Figure 1:
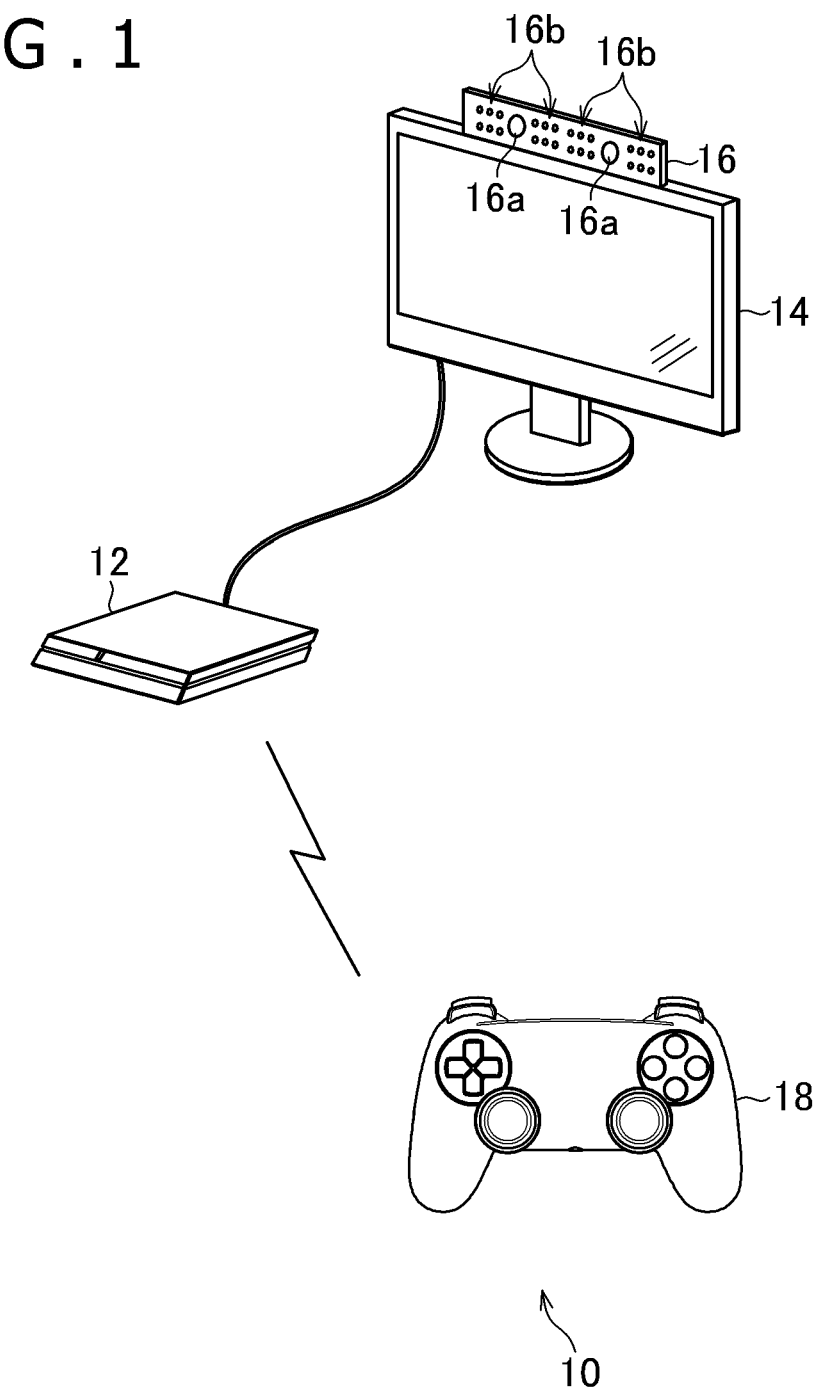
FIG. 1 is a perspective view illustrating one example of an overall configuration of an information processing system according to one embodiment of the present invention.
Figure 2:
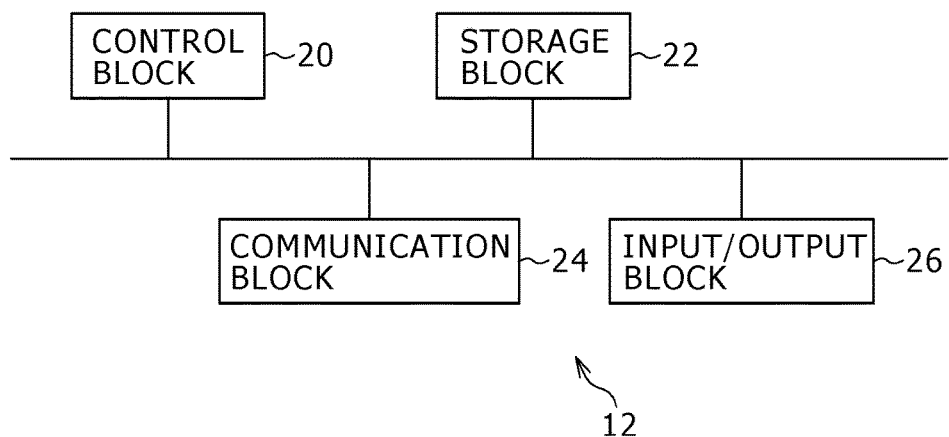
FIG. 2 is a diagram illustrating one example of a hardware configuration of an information processing apparatus according to one embodiment of the present invention.

Now, referring to FIG. 1, there is shown one example of an overall configuration of an information processing system 10 according to one embodiment of the present invention. As shown in FIG. 1, the information processing system 10 according to the present embodiment has an information processing apparatus 12, a display 14, a camera/microphone unit 16, and a controller 18.

The information processing system 10 according to the present embodiment is a computer such an entertainment device or the like as a game console for example and includes a control block 20, a storage block 22, a communication block 24, and an input/output block 26. The control block 20 is a program control device such as a CPU (Central Processing Unit) that operates in accordance with a program installed on the information processing apparatus 12, for example. The control block 20 according to the present embodiment also has a GPU (Graphics Processing Unit) that draws images to a frame buffer on the basis of graphics commands and data supplied from the CPU. The storage block 22 is a storage element such as a ROM (Read Only Memory) or RAM (Random Access Memory) or a hard disk drive. The storage block 22 stores programs and so on that are executed by the control block 20. In addition, the storage block 22 according to the present embodiment secures an area for a frame buffer on which an image is drawn by the GPU. The communication block 24 is a communication interface or the like such as an Ethernet (registered trademark) module or a wireless LAN (Local Area Network) module, for example. The input/output block 26 is an input/output port such as an HDMI (registered trademark) (High-Definition Multimedia Interface) port or a USB (Universal Serial Bus) port.

The display 14 according to the present embodiment is a liquid crystal display or the like that displays a screen or the like to be generated by the information processing apparatus 12. Further, the display 14 according to the present embodiment has a speaker that outputs audio based on audio data generated by the information processing apparatus 12. The camera/microphone unit 16 according to the present embodiment has a camera 16a that outputs an image obtained by taking a subject for example to the information processing apparatus 12 and a microphone 16b that converts obtained ambient audio into audio data and outputs this audio data to the information processing apparatus 12.

The information processing apparatus 12 and the display 14 are interconnected with an AV (Audio Visual) cable or an HDMI cable, for example. The information processing apparatus 12 and the camera/microphone unit 16 are interconnected with a USB cable, an AV cable, or an HDMI cable, for example.

The controller 18 according to the present embodiment is a manipulation input device through which a manipulation done on the information processing apparatus 12 is entered. The controller 18 according to the present embodiment has operators such as buttons, a touch panel, and an operator stick, for example. In addition, the controller 18 according to the present embodiment has sensors such as a gyro sensor for detecting angular velocity and an acceleration sensor for detecting acceleration velocity, for example. Further, the controller 18 according to the present embodiment has a jack in which a plug included in a microphone is inserted so as to enter audio through this microphone. Audio entered through the microphone inserted in the controller 18 is converted by the controller 18 into audio data to be outputted to the information processing apparatus 12.

In the present embodiment, a user enters a speech into the microphone 16b of the camera/microphone unit 16 or a microphone connected to the controller 18, upon which the information processing apparatus 12 recognizes the entered speech. Then, if the recognition is successful, the identification of a command according to a result of the recognition of the speech (the speech accepted by this information processing apparatus 12) entered in this information processing apparatus 12 is enabled in the information processing apparatus 12 according to the present embodiment. Next, the information processing apparatus 12 according to the present embodiment executes the processing corresponding to the identified command. In such a manner described above, in the present embodiment, the user can execute a manipulation of the information processing apparatus 12 by a speech. It should be noted that, in the present embodiment, while the plug of the microphone is inserted in the jack of the controller 18, the recognition result of a speech entered in this microphone is handled prior to the recognition result of a speech entered in the microphone 16b of the camera/microphone unit 16.

In addition, the information processing apparatus 12 according to the present embodiment executes various kinds of processing in one of execution states; a normal state in which input of a predetermined command by speech is disabled and a speech recognition state in which input of a predetermined command by speech is enabled. The user can appropriately switch between these execution states of the information processing apparatus 12.

Further, the user is able to execute various kinds of manipulations input by use of the controller 18 by pressing buttons and tilting the manipulation stick. In the present embodiment, the controller 18 outputs input data corresponding to each manipulation input to the information processing apparatus 12.

The controller 18 according to the present embodiment has a USB port. When connected to the information processing apparatus 12 with a USB cable, the controller 18 can output input data in a wired manner to the information processing apparatus 12 via the input/output block 26. In addition, the controller 18 according to the present embodiment has a wireless communication module or the like so as to be able to output input data in a wireless manner to the information processing apparatus 12 via the communication block 24.

Figure 3:
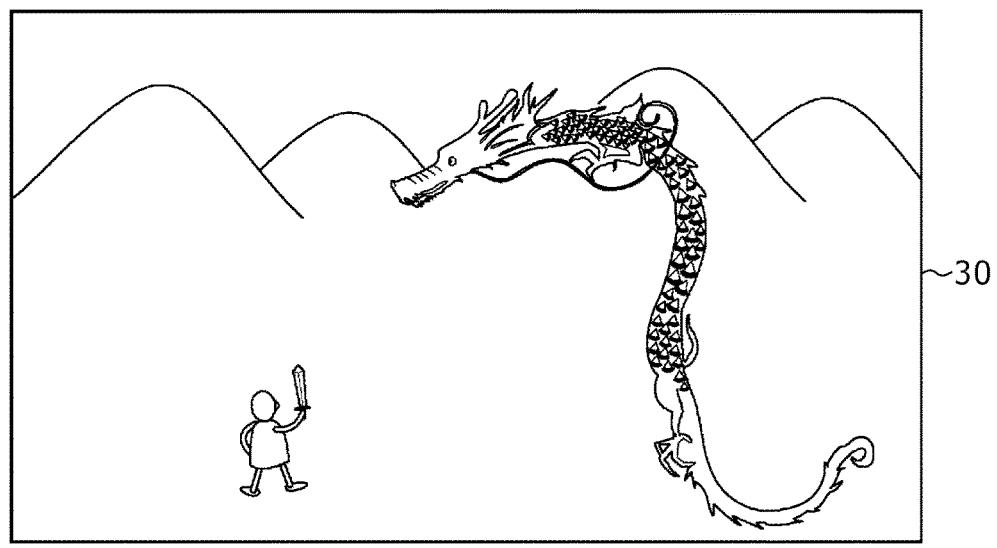
FIG. 3 is a drawing illustrating one example of a play screen.

Referring to FIG. 3, there is shown one example of a play screen 30 indicative of play contents of a game that is played by the user of the information processing apparatus 12 according to the present embodiment. In the present embodiment, the information processing apparatus 12 is in the normal state described above while the play screen 30 illustrated in FIG. 3 is shown on the display 14.

Now suppose that a speech indicative of a given phrase for starting speech recognition, such as "Start speech recognition" for example, be accepted by the information processing apparatus 12, for example. In what follows, suppose that a given phrase indicative of a speech for starting speech recognition be referred to as a magic word. Then, in the present embodiment, the displayed play screen 30 is switched to a state shown in FIG. 4. In the state shown in FIG. 4, a speech input guide image 32 is arranged for guiding the user to a speech to be entered. On the speech input guide image 32, phrases indicative of commands are arranged. In the present embodiment, while the speech input guide image 32 is thus arranged in the play screen 30, the information processing apparatus 12 is in the speech recognition state described above.

In the present embodiment, while the speech input guide image 32 is arranged in the play screen 30, entering by the user a speech indicative of a phrase arranged in the speech input guide image 32 causes the information processing apparatus 12 to identify the command indicated by this speech on the basis of the result of recognition of the speech. Then, the information processing apparatus 12 executes the processing corresponding to this command. For example, in the case of the example shown in FIG. 4, if the information processing apparatus 12 accepts a speech indicative of phrase "Home Screen," the screen shown on the display 14 is switched to a home screen in which a menu for selecting a program to be executed in the information processing apparatus 12 is arranged.

Figure 4:
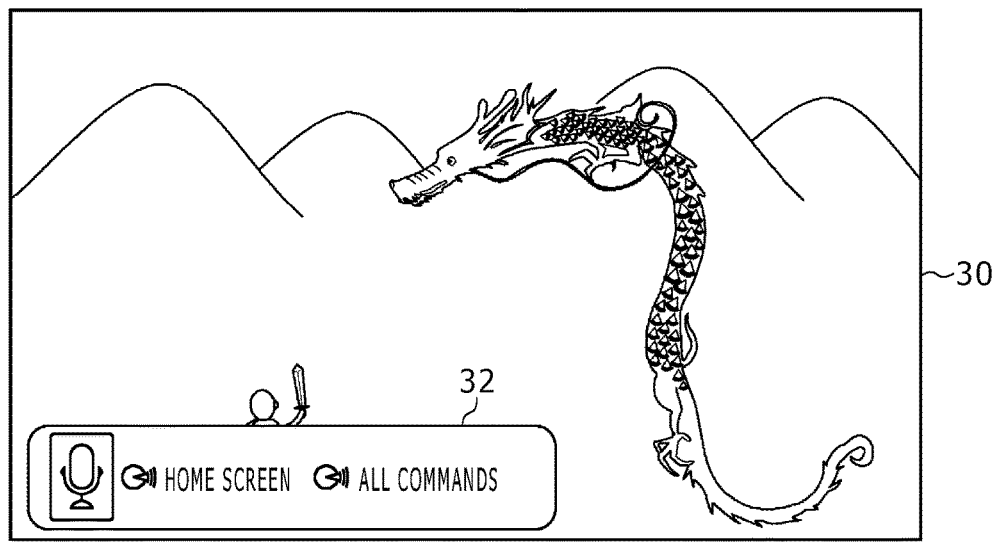
FIG. 4 is a drawing illustrating another example of the play screen.

Further, in the information processing apparatus 12 according to the present embodiment, if the phrase of a command is not arranged in the speech input guide image 32 but a speech indicative of that command is entered, the processing corresponding to that command is executed. For example, if a speech indicative of phrase "Take Screenshot" is accepted while the play screen 30 shown in FIG. 4 is displayed, a capture image obtained by capturing the display contents of the play screen 30 as a still image is stored in the storage block 22 of the information processing apparatus 12.

In addition, the information processing apparatus 12 according to the present embodiment is configured to be controlled such that the execution of processing based on speech recognition is disabled. In the case where control is executed like this, when the information processing apparatus 12 accepts a speech indicative of a magic word with the play screen 30 illustrated in FIG. 3 displayed, the displayed play screen 30 is switched to a state shown in FIG. 5. In the state shown in FIG. 5, the speech input guide image 32 for guiding the user to a speech to be entered is not arranged in the play screen 30; instead, guide information 34 indicative that the execution of processing based on speech recognition is disabled is arranged in the play screen 30. In this case, the information processing apparatus 12 does not enter the speech recognition state. Therefore, even if the information processing apparatus 12 accepts a speech indicative of a predetermined command such as "Home Screen" for example, the processing corresponding to this command is not executed.

Figure 5:
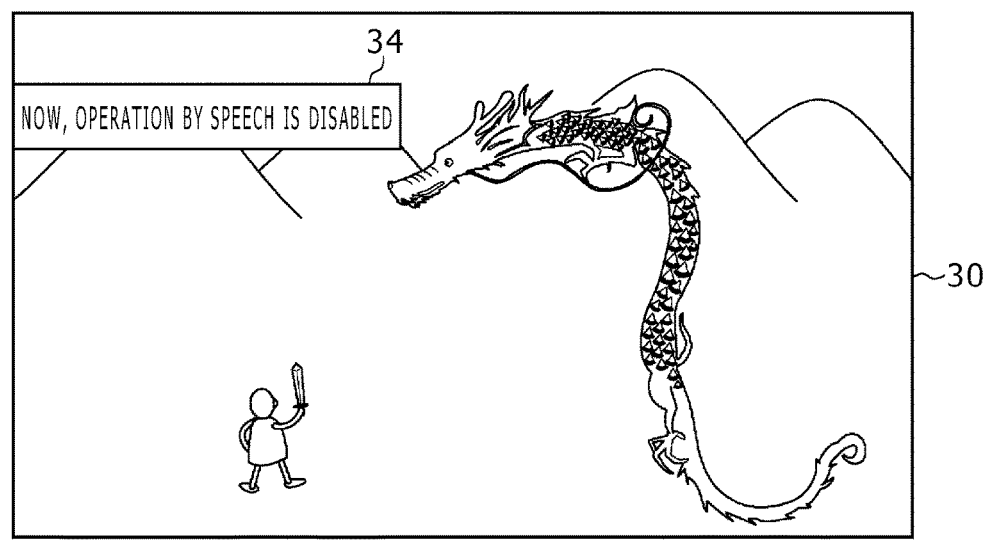
FIG. 5 is a drawing illustrating still another example of the play screen.

Still further, suppose that, in the case where the execution of processing based on speech recognition is controlled so as to be disabled, for example, a speech indicative of a predetermined command such as "Home Screen" be accepted while the play screen 30 illustrated in FIG. 3 is displayed. Then, in this case too, the guide information 34 is arranged in the play screen 30 shown as illustrated in FIG. 5 like the case where a speech indicative of a magic word is entered. Then, in this case, the processing corresponding to this command is not executed.

The following describes the control described above in detail with reference to FIG. 6.

Figure 6:
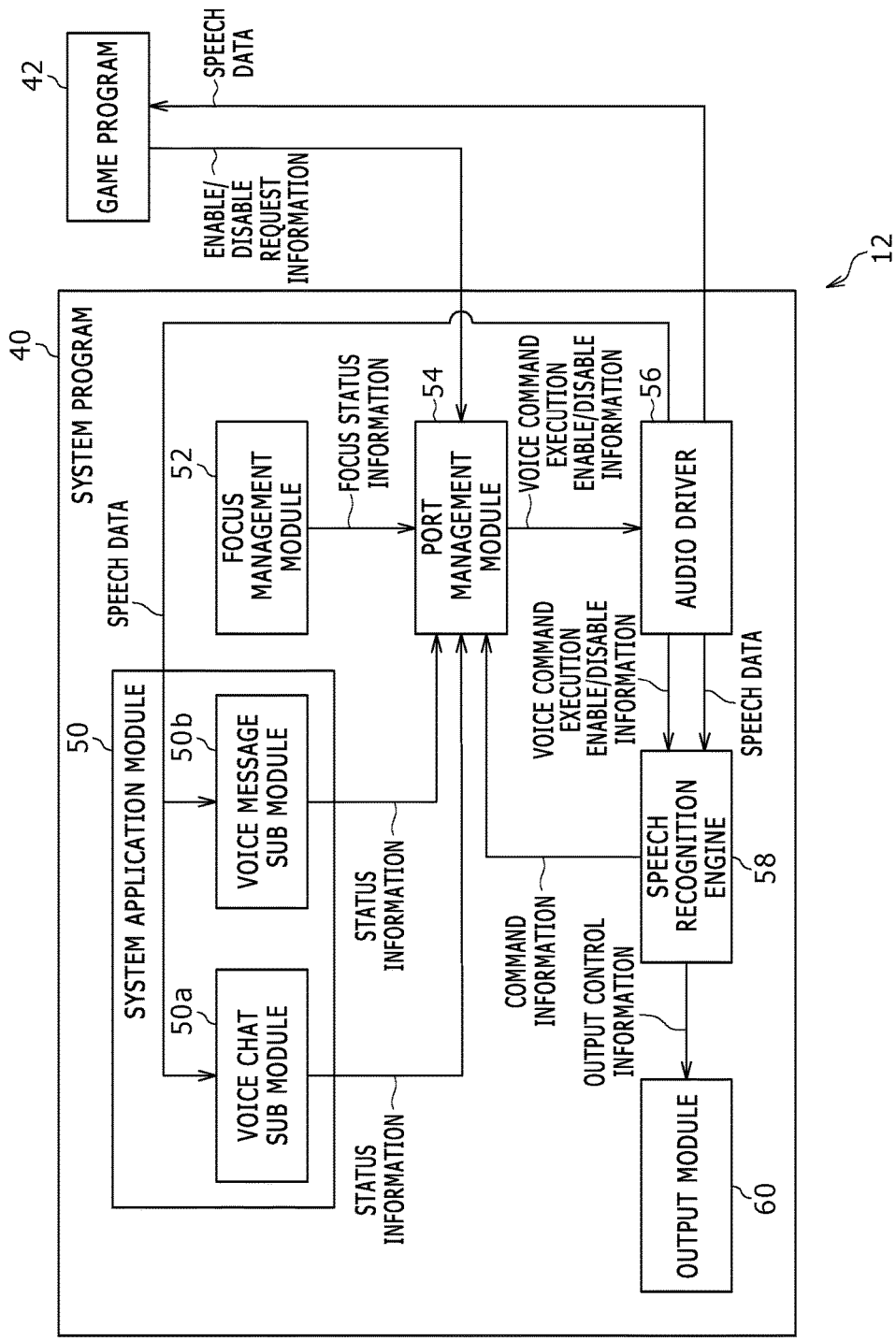
FIG. 6 is a diagram illustrating one example of a program that operates on the information processing apparatus according to one embodiment of the present invention.

Referring to FIG. 6, there is shown one example of a program that operates in the information processing apparatus 12 according to the present embodiment. As illustrated in FIG. 6, a system program 40 and a game program 42 are installed on the information processing apparatus 12 according to the present embodiment. In the present embodiment, the system program 40 and the game program 42 are independent of each other, the game program 42 operating on the system program 40. In the present embodiment, the home screen described above is generated when the information processing apparatus 12 executes the system program 40 to be displayed on the display 14. In addition, in the present embodiment, the play screen 30 illustrated in FIG. 3 through FIG. 5 is generated when the information processing apparatus 12 executes the game program 42 to be displayed on the display 14.

As shown in FIG. 6, the system program 40 according to the present embodiment is configured including a system application module 50, a focus management module 52, a port management module 54, an audio driver 56, a speech recognition engine 58, and an output module 60, for example. It should be noted that the system program 40 according to the present embodiment may include other modules.

In the present embodiment, the system application module 50 is an application program included as a part of the system program 40, for example. In the present embodiment, the system application module 50 has a voice chat sub module 50a and a voice message sub module 50b. The voice chat sub module 50a is a module for executing chat based on a speech between the user of the information processing apparatus 12 and another user. The voice message sub module 50b is a module for executing recording of a speech entered from a microphone and reproducing of the recorded speech.

The voice chat sub module 50a according to the present embodiment outputs status information indicative of an execution status of the voice chat sub module 50a to the port management module 54 while the voice chat sub module 50a is executed. For example, in the present embodiment, the voice chat sub module 50a outputs, to the port management module 54, status information of which value is "1" when a voice chat between the users is started by this voice chat sub module 50a. On the other hand, the voice chat sub module 50a outputs, to the port management module 54, status information of which value is "0" when a voice chat between the users is ended by this voice chat sub module 50a.

The voice message sub module 50b according to the present embodiment outputs, to the port management module 54, status information indicative of execution status of the voice message sub module 50b while the voice message sub module 50b is executed. For example, in the present embodiment, the voice message sub module 50b outputs, to the port management module 54, status information of which value is "1" when speech recording or reproduction is started by this voice message sub module 50b. On the other hand, the voice message sub module 50b outputs, to the port management module 54, status information of which value is "0" when speech recording or reproduction is ended by this voice message sub module 50b.

In the present embodiment, the focus management module 52 is a program for managing screen focus status, for example. In the information processing apparatus 12 according to the present embodiment can execute both the system program 40 and the game program 42 at the same time. In this case, in the present embodiment, a screen generated by one of these programs is focused. For example, if the play screen 30 illustrated in FIG. 3 through FIG. 5 is displayed on the display 14, it can be the that this play screen 30 is in a focused state. In the present embodiment, the user can execute a predetermined manipulation to switch focusing between a screen generated by the game program 42 and a screen generated by the system program 40. In addition, in the present embodiment, a program with the screen focused is executed in foreground and a program with the screen not focused is executed in background.

Next, the focus management module 52 outputs focus status information indicative of the focus status of the screen to the port management module 54, for example, in the present embodiment. For example, in the present embodiment, the focus management module 52 output, to the port management module, focus status information of which value is "1" when the screen generated by the game program 42 is focused. On the other hand, the focus management module 52 outputs, to the port management module, focus status information of which value is "0" when the screen generated by the system program 40 is focused.

Further, in the present embodiment, the game program 42 is configured to be able to output, to the port management module 54, enable/disable request information for requesting the execution of processing based on speech recognition to be enabled or disabled. For example, in the present embodiment, the game program 42 outputs, to the port management module 54, enable/disable request information of which value is "1" when requesting the execution of processing based on speech recognition to be disabled. On the other hand, the game program 42 outputs, to the port management module 54, enable/disable request information of which value is "0" when requesting the execution of processing based on speech recognition to be enabled. For example, depending upon the game program 42, it may be desired that, in order to keep a world view of a game being executed, the processing according to a speech recognition result be not executed. In addition, for example, for the game program 42 in which the execution of the processing according to a speech recognition result is enabled, there is a fear of a competition between the system program 40 and the command. For example, if a situation in which it is desired not to execute the processing according to a speech recognition result occurs such as above, enable/disable request information of which value is "1" may be configured to be outputted to the port management module 54. Further, if a situation in which it is desired not to execute the processing according to a speech recognition result is required no more, for example, enable/disable request information of which value is "0" may be configured to be outputted to the port management module 54. It should be noted that, in the present embodiment, the timing with which enable/disable request information of which value is "1" or "0" is outputted is configured to be installed as desired in the game program 42.

In the present embodiment, the port management module 54 is a program that accepts control information for controlling yes/no of the execution of processing based on speech recognition, for example. For example, the above-mentioned status information, focus status information, and enable/disable request information are the control information.

In the present embodiment, receiving the control information outputted from a program or a module being executed on the information processing apparatus 12, the port management module 54 holds this control information. Then, if the port management module 54 accepts control information of which value is different from that of the held control information, then the port management module 54 updates the value of the held control information to the value of the accepted control information.

Therefore, in the present embodiment, while a voice chat is being executed between users, for example, "1" is held as the value of status information outputted from the voice chat sub module 50a. On the other hand, while no voice chat is executed between users, "0" is held as the value of status information outputted from the voice chat sub module 50a. Further, while recording or reproduction of speech is executed, for example, "1" is held as the value of status information outputted from the voice message sub module 50b. On the other hand, while neither recording nor reproduction of speech is executed, "0" is held as the value of status information outputted from the voice message sub module 50b.

In addition, in the present embodiment, while a screen generated by the game program 42 is in a focused state, "1" is held as the value of focus status information, for example. On the other hand, while a screen generated by the system program 40 is in the focused state, "0" is held as the value of focus status information.

Further, in the present embodiment, while the execution of processing based on speech recognition is requested to be disabled from the game program 42, "1" is held as the value of enable/disable request information, for example. On the other hand, while the execution of processing based on speech recognition is requested to be enabled from the game program 42, "0" is held as the value of enable/disable request information.

Then, in the present embodiment, in accordance with the updating of the value of any one piece of held control information, a value of voice command execution enable/disable information based on the value of the held control information is determined and an output manipulation to the audio driver 56 having the value of the determined voice command execution enable/disable information is executed. In the present embodiment, suppose that the voice command execution enable/disable information of which value is "1" is indicative that the execution of processing based on speech recognition is disabled; the voice command execution enable/disable information of which value is "0" is indicative that the execution of processing based on speech recognition is enabled. In the present embodiment, when the voice command execution enable/disable information of which value is "1" is outputted, control is executed so that the execution of processing based on speech recognition is disabled as will be described later. On the other hand, when the voice command execution enable/disable information of which value is "0" is outputted, control is executed so that the execution of processing based on speech recognition is enabled as will be described later.

Referring to FIG. 7, there is shown one example of the relation between the values of control information and the values of voice command execution enable/disable information. As shown in FIG. 7, in the present embodiment, if at least one of the values of held status information is "1," then the value of voice command execution enable/disable information is determined to be "1." As described above, in the present embodiment, while any of the user-to-user voice chat, recording of speech, and reproduction of speech is executed, control is executed so that the execution of processing based on speech recognition is disabled.

In addition, as shown in FIG. 7, if the values of the held status information are all "0" and both of the value of the held focus status information and the value of the held enable/disable request information are "1," then the value of the voice command execution enable/disable information is determined to be "1." Thus, in the present embodiment, if the screen generated by the game program 42 is focused and the execution of processing based on speech recognition is requested from the game program 42 to be disabled, then control is executed so that the execution of processing based on speech recognition is disabled.

Then, in the present embodiment, if the values of the held status information are all "0" and any one of the value of the held focus status information and the value of the held enable/disable request information is "0," then the value of voice command execution enable/disable information is determined to be "0."

In the present embodiment, the audio driver 56 is a driver that accepts a speech entered in the information processing apparatus 12 through the microphone 16*b* or a microphone connected to the controller 18, for example. In the present embodiment, the microphone 16*b* or the microphone connected to the controller 18 converts the accepted speech into speech data, for example. Next, the audio driver 56 accepts the speech data thus converted. Then, the audio driver 56 outputs the accepted speech data to the speech recognition engine 58. In addition, receiving voice command execution enable/disable information from the port management module 54, the audio driver 56 outputs this voice command execution enable/disable information to the speech recognition engine 58.

It should be noted in the present embodiment that the audio driver 56 outputs the accepted speech data also to a program that uses this speech data. Here, this speech data is outputted to the voice chat sub module 50*a* and the voice message sub module 50*b*, for example. While a voice chat is executed between users, for example, the voice chat sub module 50*a* outputs the speech data accepted from the audio driver 56 to the information processing apparatus 12 that is used by the user who is the mate of the voice chat, for example. In addition, while a speech is recorded for example, the voice message sub module 50*b* stores the speech data accepted from the audio driver 56 into the storage block 22. Further, the audio driver 56 may output the accepted speech data to the game program 42. Then, the game program 42 may execute various kinds of processing in this game program 42 by use of the speech data accepted from the audio driver 56.

The speech recognition engine 58 that is a known speech recognition engine 58, for example, recognizes speech data accepted from the audio driver 56 and, if the recognition of the speech indicated by this speech data is successful, identifies a command that corresponds to the result of speech recognition. Also, the speech recognition engine 58 accepts voice command execution enable/disable information outputted from the audio driver 56.

Next, if the recognition of the speech is successful and the value of the accepted voice command execution enable/disable information is "1," the speech recognition engine 58 outputs, to the output module 60, output control information for executing control so that information indicative of the disablement of the execution of the processing based on the speech recognition is outputted.

On the other hand, if the recognition of the speech is successful and the value of the accepted voice command execution enable/disable information is "0," the speech recognition engine 58 outputs command information indicative of the identified command to the port management module 54.

In the present embodiment, the port management module 54 can identify a program that executes processing corresponding to the command indicated by the command information on the basis of the command information. Then, accepting the command information from the speech recognition engine 58, the port management module 54 outputs this command information to the program that executes the processing corresponding to the command indicated by this command information. Next, the program that has accepted this command information from the port management module 54 executes the processing corresponding to the command indicated by this command information.

In the present embodiment, the output module 60 is a program that executes control when it accepts the above-mentioned output control information from the speech recognition engine 58 so that information indicative of the disablement of the execution of processing based on speech recognition is outputted, for example. The output module 60, accepting the above-mentioned output control information from the speech recognition engine 58, executes control so that the guide information 34 illustrated in FIG. 5 is displayed on the display 14, for example. It should be noted that, when accepting the above-mentioned output control information from the speech recognition engine 58, the output module 60 may cause a speaker mounted on the display 14 to audibly output a speech indicative of the disablement of the execution of processing based on speech recognition, for example.

As described above, according to the present embodiment, when the execution of processing based on speech recognition is disabled, the user is able to recognize that, if the recognition of an accepted speech is successful, the execution of processing based on speech recognition is disabled.

It should be noted that another configuration may be provided in which the port management module 54 outputs voice command execution enable/disable information directly to the speech recognition engine 58 by bypassing the audio driver 56.

Further, the speech recognition engine 58 may accept status information directly from the system application module 50, for example. In addition, the speech recognition engine 58 may accept focus status information directly from the focus management module 52, for example. Still further, the speech recognition engine 58 may accept enable/disable request information directly from the game program 42, for example.

The following further describes functions installed on the information processing apparatus 12 and processing to be executed in the information processing apparatus 12 with respect to control for making a user recognize that the execution of processing based on speech recognition is disabled.

Figure 8:
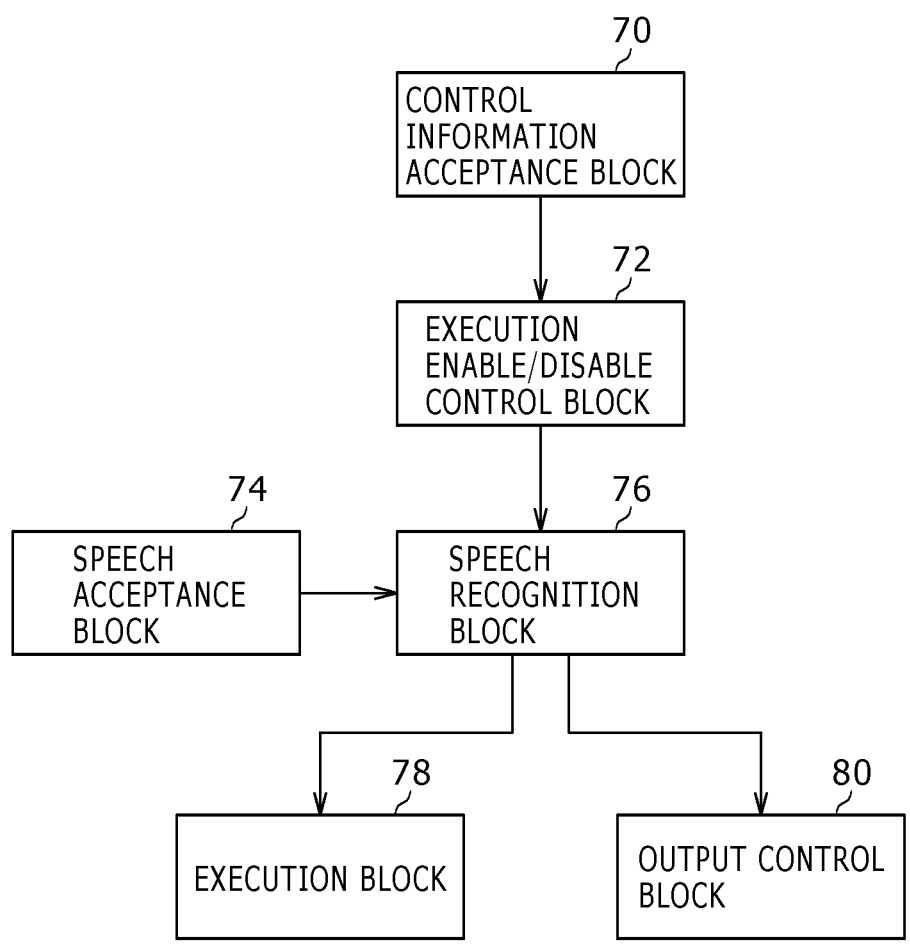
FIG. 8 is a functional block diagram illustrating one example of functions that are realized on the information processing apparatus according to one embodiment of the present invention.

Now, referring to FIG. 8, there is shown a functional block diagram illustrating one example of functions installed on the information processing apparatus 12 according to the present embodiment with respect to control for making a user recognize that the execution of processing based on speech recognition is disabled. It should be noted that all the functions shown in FIG. 8 need not be installed on the information processing apparatus 12 according to the present embodiment; alternatively, functions other than those shown in FIG. 8 may be installed in the information processing apparatus 12 according to the present embodiment.

As shown in FIG. 8, the information processing apparatus 12 according to the present embodiment functionally has a control information acceptance block 70, an execution enable/disable control block 72, a speech acceptance block 74, a speech recognition block 76, an execution block 78, and an output control block 80, for example. The control information acceptance block 70, the execution enable/disable control block 72, the speech recognition block 76, and the execution block 78 are implemented using mainly the control block 20. The speech acceptance block 74 is implemented using mainly the input/output block 26. The output control block 80 is implemented using mainly the input/output block 26.

The functions of the control information acceptance block 70 and the execution enable/disable control block 72 are equivalent to the function that is mounted in the port management module 54 shown in FIG. 6, for example. The function of the speech acceptance block 74 is equivalent to the function that is mounted in the audio driver 56 shown in FIG. 6, for example. The function of the speech recognition block 76 is equivalent to the function mounted in the speech recognition engine 58 shown in FIG. 6, for example. The function of the execution block 78 is equivalent to the function that is mounted in a program that is the output destination of command information outputted by the port management module 54 shown in FIG. 6. The function of the output control block 80 is equivalent to the function that is mounted in the output module 60 shown in FIG. 6, for example.

The functions mentioned above are mounted by executing, in the control block 20, programs including commands corresponding to these functions, these programs being installed in the information processing apparatus 12 that is a computer. These programs are supplied to the information processing apparatus 12 through an information storage medium such as an optical disc, a magnetic disc, a magnetic tape, a magneto-optical disc, a flush memory, and other computer-readable information storage medium or through communication means such as the Internet.

In the present embodiment, the control information acceptance block 70 accepts control information for controlling the enable/disable of the execution of processing based on speech recognition from a program being executed by the information processing apparatus 12. The control information acceptance block 70 accepts status information, a focus information, and enable/disable request information, for example. Thus, the control information acceptance block 70 may accept the control information from such two or more programs being executed as the voice chat sub module 50*a*, the voice message sub module 50*b*, the focus management module 52, and the game program 42, for example. In addition, at least one of two or more programs that output control information may be the game program 42 that is executed independently of the system program 40 that is executed in the information processing apparatus 12.

In the present embodiment, the execution enable/disable control block 72 controls the enable/disable of the execution of processing based on speech recognition. On the basis of the control information accepted by the control information acceptance block 70, the execution enable/disable control block 72 may control the enable/disable of the execution of processing based on speech recognition. This allows the program being executed in the information processing apparatus 12 to control the enable/disable of the execution of processing based on speech recognition. The execution enable/disable control block 72 generates voice command execution enable/disable information and outputs this information to the speech recognition block 76 as described above, for example.

The speech acceptance block 74 accepts speeches in the present embodiment.

In the present embodiment, the speech recognition block 76 recognizes speeches accepted by the speech acceptance block 74. In the present embodiment, if speech recognition is successful, the speech recognition block 76 outputs the above-mentioned output control information to the output control block 80 or the above-mentioned command information to the execution block 78 in accordance with control by the execution enable/disable control block 72. In the present embodiment, if the execution of processing based on speech recognition is controlled by the execution enable/disable control block 72 to be disabled, for example, the output control information is outputted to the output control block 80. On the other hand, if the execution of processing based on speech recognition is controlled by the execution enable/disable control block 72 to be enabled, then a command according to the result of speech recognition is identified and command information indicative of this identified command is outputted to the execution block 78.

If the execution of processing based on speech recognition is controlled by the execution enable/disable control block 72 to be enabled, then the execution block 78 executes the processing according to the result of speech recognition if the speech recognition by the speech recognition block 76 is successful. If the execution block 78 accepts command information from the speech recognition block 76, for example, the execution block 78 executes the processing corresponding to a command indicated by this command information.

It should be noted that a command that can be entered by speech may be entered by such a manipulation done on the controller 18 as pressing of a predetermined button, for example. In accordance with the manipulation input accepted from the controller 18, the execution block 78 may execute the processing corresponding to a command that can also be entered by speech. In addition, if the execution of processing based on speech recognition is controlled by the execution enable/disable control block 72 to be disabled, then the execution block 78 may execute, in accordance with the manipulation input accepted from the controller 18, the processing controlled to be disabled in accordance with the result of speech recognition. Further, if the execution of processing based on speech recognition is controlled by the execution enable/disable control block 72 to be enabled, the execution block 78 may execute the processing corresponding to a command that can also be entered by speech in accordance with the manipulation input accepted from the controller 18.

If the speech recognition by the speech recognition block 76 is successful and the execution of processing based on speech recognition is controlled to be disabled, the output control block 80 executes control so that information indicative of the disablement of the execution of processing based on speech recognition is outputted in accordance with the success in this recognition. If the output control block 80 accepts output control information from the speech recognition block 76 for example, the output control block 80 causes the display 14 to display the guide information 34 illustrated in FIG. 5. It should be noted that a program that outputted control information may be shown in the guide information that is controlled by the output control block 80 to be outputted. This configuration allows the user to recognize a program that causes the disablement of the execution of processing based on speech recognition.

It should be noted that the execution enable/disable control block 72 may execute control so that the execution of processing based on speech recognition according to some of commands is disabled. In addition, the output control block 80 may execute control so that, when a command controlled to disable the execution of processing is identified as a result of speech recognition, information indicative of the disablement of the processing corresponding to the command in accordance with identification of this command is outputted. For example, in the example shown in FIG. 6, suppose that the speech recognition engine 58 accepts status information of which value is "1" directly from the voice chat sub module 50*a*. In this case, the processing to be executed in the voice chat sub module 50*a* may be controlled so that the execution of processing based on speech recognition is disabled. Then, for the processing to be executed by another program, control may be executed so that the execution of processing based on speech recognition is enabled. This configuration allows, even if control is executed so that the execution of processing based on speech recognition is disabled for some commands, the input based on speech recognition by other commands.

Figure 9:
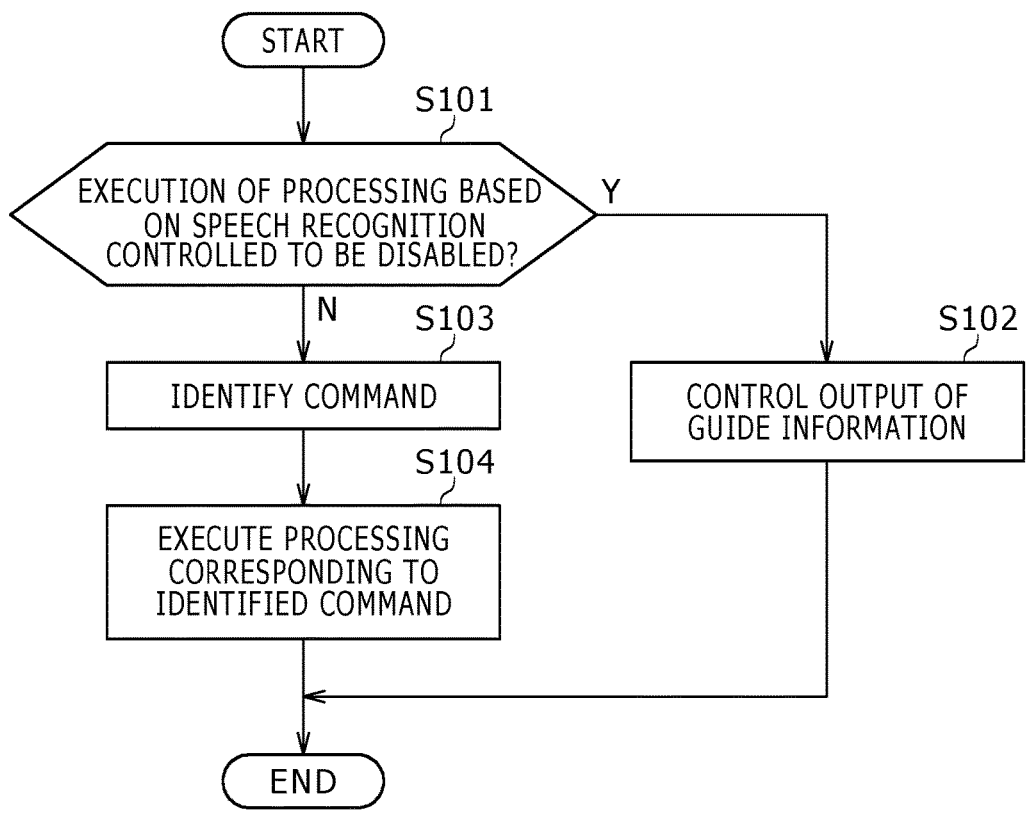
FIG. 9 is a flow chart indicative of one example of a flow of processing that is executed on the information processing apparatus according to one embodiment of the present invention.

The following describes, with reference to the flowchart illustrated in FIG. 9, one example of the flow of processing that is executed in the information processing apparatus 12 according to the present embodiment if the recognition, by the speech recognition block 76, of a speech accepted by the speech acceptance block 74 is successful.

First, the speech recognition block 76 checks whether or not the execution of processing based on speech recognition is controlled by the execution enable/disable control block 72 to be disabled (S101). In the above-mentioned example, the processing shown in S101 checks whether the value of the voice command execution enable/disable information accepted by the speech recognition engine 58 from the audio driver 56 is "1" or "0."

Next, if control is executed so that the execution of processing based on speech recognition is disabled (S101: Y), then the output control block 80 executes control so that such information indicative disablement of the execution of processing based on speech recognition as the guide information 34 illustrated in FIG. 5 is outputted (S102). Then, the processing indicated by the present processing example comes to an end.

On the other hand, control is executed by the execution enable/disable control block 72 so that the execution of processing based on speech recognition is enabled (S101: N), the speech recognition block 76 identifies a command corresponding to a successfully recognized speech (S103). Next, the execution block 78 executes the processing corresponding to the command identified by the processing shown in S103 (S104). Then, the processing indicated by the present processing example comes to an end.

It should be noted that the present invention is not limited to the embodiment mentioned above.

For example, the present embodiment may be applied to a scene in which a user is viewing a game played by this user, a game being played or already played by another user. For example, while a user is viewing the playing of a game, a scene in which it is desired that the processing according to a speech recognition result be not executed may be displayed. For example, if a speech accepted in the above-mentioned situation is successfully recognized, it may be configured that the user recognizes the disablement of the execution of processing based on speech recognition in the above-mentioned manner.

Further, the information processing apparatus 12 may be a portable game device having the camera 16*a* and the microphone 16*b*, for example. Also, the information processing apparatus 12 may be a personal computer, a tablet terminal, a smart phone, or the like.

Still further, the information processing apparatus 12 may be a head-mounted display that can display programs of two or more channels and switch between displayed channels by speech, for example. Suppose that this head-mounted display accepts a speech and is successful in the recognition of this speech, for example. In this case, if control is executed so that the execution of processing based on speech recognition is disabled, information indicative that the switching between channels by speech recognition in accordance with this successful recognition is disabled may be outputted to this head-mounted display.

Yet further, the roles of the information processing apparatus 12, the display 14, and the camera/microphone unit 16 are not limited to those described above. In addition, the information processing apparatus 12 may be configured by two or more housings.

It should be noted that the above-mentioned specific character strings and the specific character strings in the drawings are illustrative only and therefore any character strings other than the above-mentioned character strings may be used.

The invention claimed is:

1. A control apparatus comprising:
a speech acceptance block configured to accept a speech;

an execution block configured to execute processing according to a result of recognition of the speech;

an output control block configured to execute output control so that information indicative that execution of processing based on speech recognition is disabled is outputted;

a control information acceptance block configured to accept control information for controlling enablement/disablement of the execution of processing based on speech recognition from a program being executed; and an execution enable/disable control block configured to control enablement/disablement of the execution of processing according to the result of the recognition of the speech on the basis of the control information accepted by the control information acceptance block, wherein, when control is executed to enable the execution of processing based on speech recognition, the execution block executes the processing according to the result of the recognition of the speech if-when the recognition of the speech is successful, when control is executed to disable the execution of processing based on speech recognition, the output control block executes control so that information indicative that the execution of processing based on speech recognition is disabled is outputted when the recognition of the speech is successful, and the control information acceptance block accepts the control information from a plurality of programs being executed, at least one of the plurality of programs being a game program that is executed separately from a system program that is executed on the control apparatus.

2. The control apparatus according to claim 1, wherein output control of information for guiding a speech to be entered is executed as the execution of processing according to the result of the recognition of the speech.

3. The control apparatus according to claim 1, wherein the execution enable/disable control block executes control to disable the execution of processing according to the result of the recognition of the speech while any of a voice chat between users, recording of a speech, and reproduction of a speech is executed.

4. The control apparatus according to claim 1, wherein information indicative that the execution of processing based on speech recognition is disabled shows a program that outputted the control information, the information being controlled to be outputted by the output control block.

5. The control apparatus according to claim 1, wherein the execution block executes the processing controlled to be disabled in accordance with a result of recognition of the speech corresponding to a manipulation input accepted from a controller.

6. The control apparatus according to claim 1, wherein the execution enable/disable control block executes control so that the execution of processing according to a command based on speech recognition for some of a plurality of commands is disabled; and the output control block executes control so that, when a command belonging to the some of the plurality of commands is identified as the result of the recognition of the speech, information indicative that execution of processing corresponding to the command is disabled in accordance with the identification of the command is outputted.

7. A control method comprising:
accepting a speech;
executing processing according to a result of recognition of the speech;

executing output control so that information indicative that execution of processing based on speech recognition is disabled is outputted;

accepting control information for controlling enablement/disablement of the execution of processing based on speech recognition from a program being executed; and controlling enablement/disablement of the execution of processing according to the result of the recognition of the speech on the basis of the control information accepted by the control information acceptance block, wherein, when control is executed to enable the execution of processing based on speech recognition, the executing executes the processing according to the result of the recognition of the speech when the recognition of the speech is successful, when control is executed to disable the execution of processing based on speech recognition, the executing output control executes control so that information indicative that the execution of processing based on speech recognition is disabled is outputted when the recognition of the speech is successful, and the controlling includes accepting the control information from a plurality of programs being executed, at least one of the plurality of programs being a game program that is executed separately from a system program that is executed on the control apparatus.

8. A computer, including a microprocessor and a non-transitory computer readable storage medium containing a program, which when executed by the microprocessor, causes the computer to execute actions, comprising:

accepting, by a speech acceptance block, a speech;

executing, by an execution block, processing according to a result of recognition of the speech;

executing output control, by an output control block, so that information indicative that execution of processing based on speech recognition is disabled is outputted;

accepting, by a control information acceptance block, control information for controlling enablement/disablement of the execution of processing based on speech recognition from a program being executed; and controlling, by an execution enable/disable control block, enablement/disablement of the execution of processing according to the result of the recognition of the speech on the basis of the control information accepted by the control information acceptance block, wherein, when control is executed to enable the execution of processing based on speech recognition, the executing executes the processing according to the result of the recognition of the speech when the recognition of the speech is successful, when control is executed to disable the execution of processing based on speech recognition, the executing output control executes control so that information indicative that the execution of processing based on speech recognition is disabled is outputted when the recognition of the speech is successful, and the controlling includes accepting the control information from a plurality of programs being executed, at least one of the plurality of programs being a game program that is executed separately from a system program that is executed on the control apparatus.

9. A non-transitory, computer-readable information storage medium storing a program, which when executed by a computer, causes the computer to execute actions, comprising:

accepting, by a speech acceptance block, a speech;

executing, by an execution block, processing according to a result of recognition of the speech;

executing output control, by an output control block, so that information indicative that execution of processing based on speech recognition is disabled is outputted;

accepting by a control information acceptance block, control information for controlling enablement/disablement of the execution of processing based on speech recognition from a program being executed; and controlling, by an execution enable/disable control block, enablement/disablement of the execution of processing according to the result of the recognition of the speech on the basis of the control information accepted by the control information acceptance block, wherein, when control is executed to enable the execution of processing based on speech recognition, the executing executes the processing according to the result of the recognition of the speech when the recognition of the speech is successful, when control is executed to disable the execution of processing based on speech recognition, the executing output control executes control so that information indicative that the execution of processing based on speech recognition is disabled is outputted when the recognition of the speech is successful, and the controlling includes accepting the control information from a plurality of programs being executed, at least one of the plurality of programs being a game program that is executed separately from a system program that is executed on the control apparatus.

* * * * *